May 7, 1929.  F. G. BREYER ET AL  1,712,134
REDUCING ZINCIFEROUS MATERIALS
Filed April 20, 1927   6 Sheets-Sheet 1

INVENTORS
Frank G. Breyer
Earl H. Bunce
By: Pennie, Davis,
Marvin & Edmonds
ATTORNEYS May 7, 1929.  F. G. BREYER ET AL  1,712,134
REDUCING ZINCIFEROUS MATERIALS
Filed April 20, 1927   6 Sheets-Sheet 2

May 7, 1929.  F. G. BREYER ET AL  1,712,134
REDUCING ZINCIFEROUS MATERIALS
Filed April 20, 1927  6 Sheets-Sheet 6

INVENTORS
Frank G. Breyer
Carl H. Bunce
By: Pennie, Davis,
Marvin & Edmonds
ATTORNEYS Patented May 7, 1929.

1,712,134

UNITED STATES PATENT OFFICE.

FRANK G. BREYER AND EARL H. BUNCE, OF PALMERTON, PENNSYLVANIA, ASSIGNORS TO THE NEW JERSEY ZINC COMPANY, OF NEW YORK, N. Y., A CORPORATION OF NEW JERSEY.

REDUCING ZINCIFEROUS MATERIALS.

Application filed April 20, 1927. Serial No. 185,331.

This invention relates to the reducing or smelting of zinciferous materials and has for its object the provision of certain improvements in the reduction or smelting of such materials. The invention aims particularly to provide a new method of reducing or smelting zinciferous materials in which very substantially larger charges may be more economically worked with substantially increased extraction of zinc and with increased recoveries of commercially marketable forms of zinc, than in the heretofore customary practices of commercial zinc smelting. A further object of the invention is to provide a commercially economical and practical method of reducing or smelting zinciferous material in a substantially horizontal and externally heated reducing chamber, preferably in a substantially continuous manner, and on a relatively large scale and in which there is produced metallic zinc vapor capable of being directly and economically condensed to zinc metal. Another object of the invention is the provision of an improved zinc smelting apparatus or furnace having a substantially horizontal and externally heated reducing chamber through which the charge undergoing reduction is progressively advanced.

In our copending patent application, Serial No. 163,902, filed January 27, 1927, we have described an improved method of reducing a porous charge of agglomerates of mixed zinciferous and reducing materials in which the transfer of heat through the charge is effected in large part by currents of hot gases flowing through the voids of the charge. In one of its aspects, the present invention involves the practice of the invention of that application in a substantially horizontal and externally heated reducing chamber through which the porous charge progressively passes. In another aspect, the invention contemplates progressively passing a porous charge of agglomerates of mixed zinciferous and reducing materials through a substantially horizontal and externally heated reducing chamber under conditions substantially avoiding relative movement of the individual agglomerates, and in the course of such passage heating the charge to a sufficiently high temperature to reduce the compounds of zinc and volatilize the resulting metallic zinc, preferably without slagging or fusing the charge. The resulting metallic zinc vapor is withdrawn from the reducing chamber and may advantageously be condensed to zinc metal. The porous charge of agglomerates of mixed zinciferous material and carbonaceous reducing agent may be supported, in its passage through the reducing chamber, on a traveling hearth, or the like. It is our preferred practice to support the porous charge on a bed of fines carried by a traveling conveyor moving through the reducing chamber and, in effect, constituting the bottom thereof. While the invention may be used for the production of any of the usual commercial products obtained in zinc smelting, such as spelter, zinc oxide, zinc dust or blue powder, it is of special advantage when used for the production of zinc metal or spelter.

In practicing the method of zinc smelting described in our aforementioned application, it is important that the agglomerates constituting the porous charge should not, in their passage through the reducing chamber, break down or sand and thereby choke or fill the voids between the agglomerates to an objectionable extent, since these voids constitute the heat-carrying gas passages upon which depends the efficacy of the process for large distilling chambers. When agglomerated zinc ore and carbonaceous reducing agent are heated up to zinc reducing temperatures and zinc is distilled off, the agglomerates pass through various stages of tenderness or lack of coherence between the particles of ore and reducing agent, thus making them more or less readily friable or possessed of a sanding tendency. This tenderness or sanding tendency is affected by the nature of the ore, the nature of the reducing agent, and the nature of any reduction activators present, as well as by the bonding agency that holds together the relatively small particles composing the agglomerate. It is also affected by the way in which the bond has been established, as well as by the rate at which the agglomerates are heated in the reducing chamber.

When the particles of the agglomerate are bonded together with a caking material like bituminous coal, sanding difficulties may be practically eliminated by suitable choice of ores and reducing agents. On the other hand, even with the excellent bond provided by caking materials, sanding difficulty is encountered with certain types of roasted sulfide ores, and more particularly with certain reduction activators, like sodium carbonate, which have a marked tendency to destroy a caked or coked bond at zinc reducing temperatures. When the reducing agent is fine anthracite coal and the bond is dried waste sulfite liquor, very slight shearing or abrading action, such as would be caused by withdrawing residues from a vertical retort, is sufficient to sand or powder the whole agglomerate, especially after most of the zinc has been eliminated.

It will, therefore, be seen that in order to have the greatest latitude in the selection of ores, reducing agents, reduction activators and bonding agencies, as well as the greatest freedom in the heating up of the charge in the reducing chamber, it is important that the agglomerates be furnaced with as little shearing or abrading stress between the agglomerates as possible. This requirement of minimum abrading and shearing stresses between the agglomerates of a porous charge is not easily satisfied where at the same time it is required that the porous charge be progressively passed through the reducing chamber.

The method of our present invention, in which the porous charge of agglomerates is progressively advanced through a substantially horizontal reducing chamber while supported in a relatively quiescent condition on a traveling hearth, admirably satisfies the charge progression demand, and at the same time permits the use of the greatest variety of ores, reducing agents, reduction activators, and bonding agencies, without danger of impairing the desired porosity of the charge during furnacing. In the method of the invention, the agglomerates are progressed or advanced through the reducing chamber with substantially no attrition one upon the other and with only the side wall abrasion to produce void-filling fines. The wider a furnace for any given charge, the less important this side wall abrasion becomes.

The passage of the porous charge of agglomerates through the reducing chamber under conditions substantially avoiding relative movement of the individual agglomerates is, therefore, one of the characteristic features of our invention. In accordance with this aspect of the invention, the porous charge of agglomerates is progressively passed through the reducing chamber without substantial breaking down of the agglomerates and without substantial relative movement of the individual agglomerates during such passage. By "relative movement of individual agglomerates" in "a porous charge of agglomerates", we mean either translatory movement or rotary movement, or both, of one or more agglomerates with respect to any other agglomerate or agglomerates in the charge whereby abrading and rupturing stresses are imposed upon the agglomerates. By avoiding such relative movement of individual agglomerates in their passage through the reducing chamber, we are able to furnace agglomerates that are relatively very tender and possess pronounced sanding tendencies under the conditions of operation prevailing in the reducing chamber.

The improved method and apparatus of the invention permit the smelting of a porous charge of agglomerates, and more particularly agglomerates having pronounced sanding tendencies, without substantial disturbance or jostling of the individual agglomerates. The invention is particularly applicable to the treatment of hot, caked agglomerates of ore and caking coal mixed with an appropriate reduction activator such as sodium carbonate. The reduction activator has a pronounced tendency to make the agglomerates tender and liable to sand under the conditions encountered in the reducing chamber. Such agglomerates, after caking at approximately 700° C., are relatively strong and may be transferred red hot from the caking furnace to the charging end of the horizontal reducing chamber without substantial fracturing or sanding. When, however, such agglomerates are passed through the reducing chamber, and especially after a considerable proportion of their zinc content has been distilled off, they become relatively tender. By the method of the invention, such agglomerates are carried through the reducing chamber substantially in the same physical size and shape as they enter the reducing chamber from the charging hopper.

In addition to insuring the passage of the agglomerates through the reducing chamber without abrading and rupturing stresses, the method of the invention prevents packing of the agglomerates due to their jostling and settling together. Such packing of the agglomerates tends to reduce the porosity of the charge and thereby reduces the rate at which heat can be transferred to those portions of the charge remote from the heated wall of the reducing chamber.

The costs of agglomerating and handling the agglomerates through dryers, caking apparatus, deoxidizers, and the like, preceding the introduction of the agglomerates into the reducing chamber, constitute a very substantial proportion of the total costs of the reducing operation. The method of the invention makes possible very substantial economies in the costs of handling the agglomerates. Thus, when agglomerating by briquetting, a traveling hearth or pan conveyor serves as an excellent receiver for briquettes discharged from a briquetting press, and when this traveling hearth or pan conveyor serves at the same time to support the briquettes in their passage through dryers, caking apparatus, or other auxiliaries, as well as through the reducing chamber, very important economies are realized in the operating costs, more particularly in supervision. labor, and briquette-breakage costs.

With the horizontal furnace of the invention, the furnace structure, auxiliaries, recuperator, deoxidizer, and other appurtenances may be built on ground level foundations in convenient relation with one another. Certain economies in the construction, operation and maintenance costs of the furnace thus become possible, as compared with furnaces in which the reducing chamber is in an upright or vertical position. In the present invention, all of the charge end auxiliaries, such as agglomerating apparatus, dryers, caking apparatus, etc., can be on the ground level, and whatever attention these auxiliaries, or other appurtenances of the furnace, require can be more readily and economically provided than in the case of an apparatus having the auxiliaries or appurtenances on different levels.

When anthracite fines or anthracite dust coal is used as the reducing agent and the agglomerates are made by briquetting and bonding together the relatively fine ore and coal by means of dried sulfite liquor, the drying and deoxidizing chamber may advantageously be an extension of the reducing chamber in advance of the zone where the first zinc laden gases are taken off to the condensers. When a recuperator is included in the apparatus, the drying and deoxidizing chamber may be externally heated by the gases exiting from the recuperator, which gases would otherwise go direct to a stack. If desired, the recuperator exit gases may be passed directly over or through the agglomerates in the drying and deoxidizing chamber. The gases from the deoxidizing chamber, particularly when bituminous coal is used as a caking and/or reducing agent, may be blown or drawn into the fuel gas main of the recuperator and utilized in the firing of the heating flue of the reducing chamber. With such an arrangement of apparatus, a briquetting press may advantageously be so positioned as to feed the briquettes discharging therefrom to the front end of the drying and deoxidizing chamber by gravity. Preferably, the briquettes are discharged from the press onto a grizzly over which they pass by gravity to the forward or charging end of the traveling hearth. The traveling hearth then extends continuously through the drying, deoxidizing, and reducing chamber or chambers of the apparatus. With such an arrangement of apparatus, the agglomerates are subjected to the minimum amount of handling and disturbance, and little, and frequently no, bonding agencies are necessary. The fines in the ore and coal, the intimate mixing and the briquetting pressure are often sufficient to form agglomerates that will hold together during their passage through the drying, deoxidizing and reducing chambers where the only strains the agglomerates encounter are those of decrepitation or disruption of an agglomerate from within as water vapor, reduction gases and zinc vapor are evolved therefrom.

When bituminous or caking coal is used as the reducing agent, the front extension of the traveling hearth may advantageously be used to support the agglomerates during a caking and deoxidizing operation. Thus, the porous charge of agglomerates supported on a traveling hearth, and preferably on a bed of fines carried by a traveling conveyor, advances first through a caking and deoxidizing chamber and then through a reducing chamber. The caking and deoxidizing temperatures and the time of caking and deoxidizing are synchronized with the reducing operation so that the agglomerates will be appropriately caked, and deoxidized as they leave the caking and deoxidizing chamber and enter the reducing chamber.

The aforementioned and other novel features of the invention will be best understood from the following description taken in conjunction with the accompanying drawings, in which.

The apparatus illustrated in the drawings comprises a substantially horizontal reducing chamber 10 embodied in an appropriate furnace structure 11 having a heating flue 12 overlying the roof or arch 13 of the reducing chamber. Gas ports 14 and 15 extend through the side wall of the furnace structure and conduct preheated air and fuel gas, respectively, from a recuperator 16 to the flue 12 where these gases are burned and the resulting hot products of combustion flow through the flue to a gas outlet 17 communicating with the recuperator.

Figure 5:
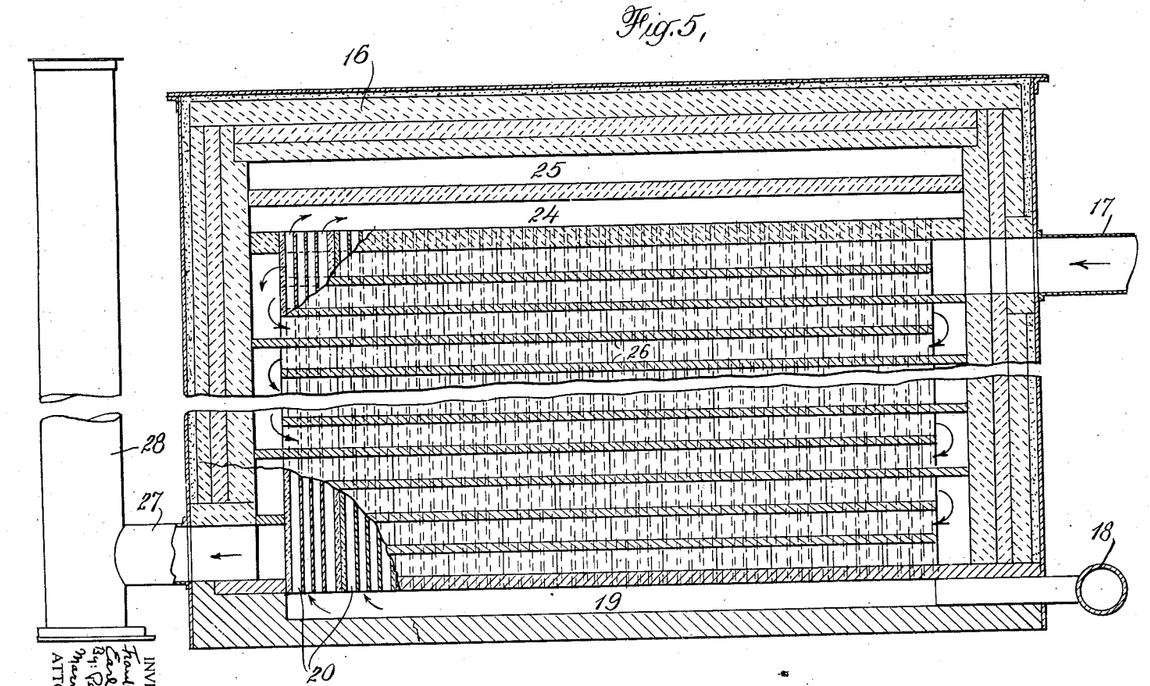
Fig. 5 is a longitudinal sectional elevation of the recuperator on the section line 5—5 of Fig. 1.

The recuperator is built alongside the charging end of the furnace. Air is supplied to the recuperator through a pipe 18 communicating with a longitudinal distributing duct 19 in the bottom of the recuperator. The air is distributed from the duct 19 to a multiplicity of vertical passages or conduits 20. Similarly, fuel gas is supplied through a pipe 21 to a distributing duct 22 and thence to a multiplicity of vertical passages or conduits 23. The passages 20 and 23 are provided in a plurality (six in the apparatus indicated) of spaced vertical walls built up of temperature-resistant brick, tile, or the like. The vertical passages 20 and 23 communicate at their tops with longitudinal ducts 24 and 25, respectively, which in turn communicate with the ports 14 and 15, respectively.

The recuperator is provided with staggered horizontal baffles 26 which cause the heating gases delivered from the gas outlet 17 of the heating flue 12 to follow a zig-zag path in their flow through the recuperator to a gas outlet 27 and communicating stack 28. The recuperator will be further provided with appropriate clean-out openings (not shown) for the various gas passages thereof.

The bottom of the reducing chamber 10 is formed by a traveling hearth which in the apparatus of the drawings comprises a pan conveyor 30 carrying a bed of fines 31. In its passage through the reducing chamber the conveyor is supported on each side by flanged rollers 32 running on rails 33, and by intermediate rollers 34 running on rails 35. It will be understood, of course, that the rollers 32 and 34 are appropriately spaced longitudinally to support the weight of the charge carried by the pan conveyor. At its ends the pan conveyor passes around appropriate guiding and/or driving wheels 36 as will be well understood by those skilled in the art.

At the charging end of the furnace a fines hopper 37, a spent agglomerate hopper 38 and a fresh agglomerate hopper 39 are arranged side by side, the agglomerate hoppers 38 and 39 being provided with mechanical sealing bells 40. The residue discharge end of the furnace is partially enclosed by a casing 41, provided with an end-door 42, normally open through which the discharge end of the moving hearth may be conveniently examined. Dust from the discharging residues is for the most part drawn into a stack 43.

A gas outlet 44 communicates with the top of the reducing chamber 10 near the charging end thereof. The outlet 44 extends transversely across substantially the entire width of the reducing chamber and projects upwardly through the flue 12 and the overlying layers of heat refractory material. Near its upper end, the outlet 44 communicates with two gas off-takes 45 operatively connected to condensers. Above the furnace structure, the outlet 44 is surrounded by a mass of dust coal 46 appropriately confined by the condenser structures and a sheet metal wall 47. A pressure responsive device 48 is inserted in the top of the outlet 44 and is operatively connected to a pressure gauge 49 and a pressure recording instrument 50.

The condensers connected to the off-takes 45 are of the multi-channeled type described in the copending patent application of Frank G. Breyer, Ser. No. 167,135, filed February 10, 1927. Each condenser comprises a gas distributing and molten metal collecting chamber 51 having a gas inlet in communication with its respective gas off-take 45. The chamber 51 is formed in a solid block of carbon and is substantially circular in horizontal section, and is covered on top by graphite blocks 52 in which a multiplicity of holes 53 are bored in concentric circles. A multitubular condensing tower is mounted on the graphite blocks 52 with its multiplicity of upright tubes or channels 54 in communication with the holes 53. The tubes 54 are graphite or carbon tubes of about one to three inches internal diameter, having their lower ends seated in appropriate recesses in the top of the graphite blocks 52. The spaces between the tubes 54 are filled with hardened carbon paste 55. The tower and carbon block (forming the chamber 51) are surrounded by a mass of dust coal 56 appropriately confined by a metal casing 57. The entire condenser structure is mounted on wheels or trucks 58 supported on top of the furnace structure. The condensers are thus conveniently moved into and away from their operative positions with respect to the gas off-takes 45.

A sheet metal hood 59 covers the tops or gas exit ends of all the channels 54. The lower edge or rim of the hood 59 is embedded to a desired extent in the surrounding dust coal 56. The hood has a top opening in which a vertically disposed exhaust pipe 60 is operatively inserted. The pipe 60 has a gate or other appropriate valve 61. A pressure responsive device 48' is inserted within the hood 59 and is operatively connected to a pressure gauge 49' and a pressure recording instrument 50'.

The chamber 51 is provided near its bottom and opposite its gas inlet with a tap hole 62 through which molten zinc metal may be withdrawn from the chamber from time to time. The tap hole 62 is normally closed by an inner graphite plug 63 secured to a manipulating rod 64 and an outer plug 65 of fire clay or the like. The chamber 51 is also provided with a clean-out opening 66, normally sealed, substantially opposite its gas inlet. Normally, the openings in the condenser structure into which the outer ends of the tap hole 62 and clean-out opening 66 extend are closed with caps 67 of graphite or other appropriate material.

The furnace illustrated in the drawings is provided with two additional condensers, making four in all. The additional condensers are of the same type and construction as those already described and are connected to gas off-takes 68 communicating with the reducing chamber 10 through appropriate flues in the side walls of the chamber. The off-takes 68 are positioned at any appropriate distance from the outlet 44, and above the furnace structure 11 are appropriately insulated by dust coal confined by a sheet metal frame 73. Dust coal insulation will also be thrown between the off-takes 68 and the condensers, after the latter have been placed in their respective operating positions. Ordinarily, the distance between the off-takes 68 and the outlet 44 will be approximately one-third the total length of the furnace.

Figure 1:
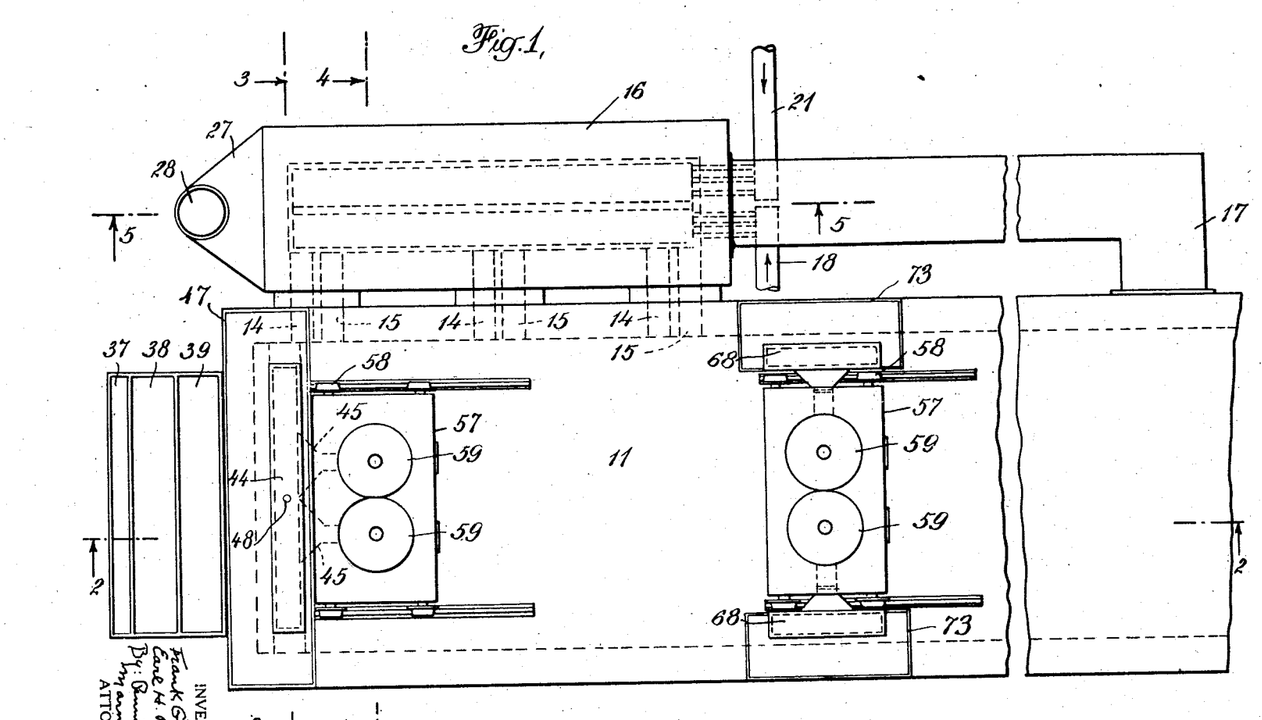
Fig. 1 is a top plan view of the improved zinc smelting apparatus of the invention.
Figure 2:
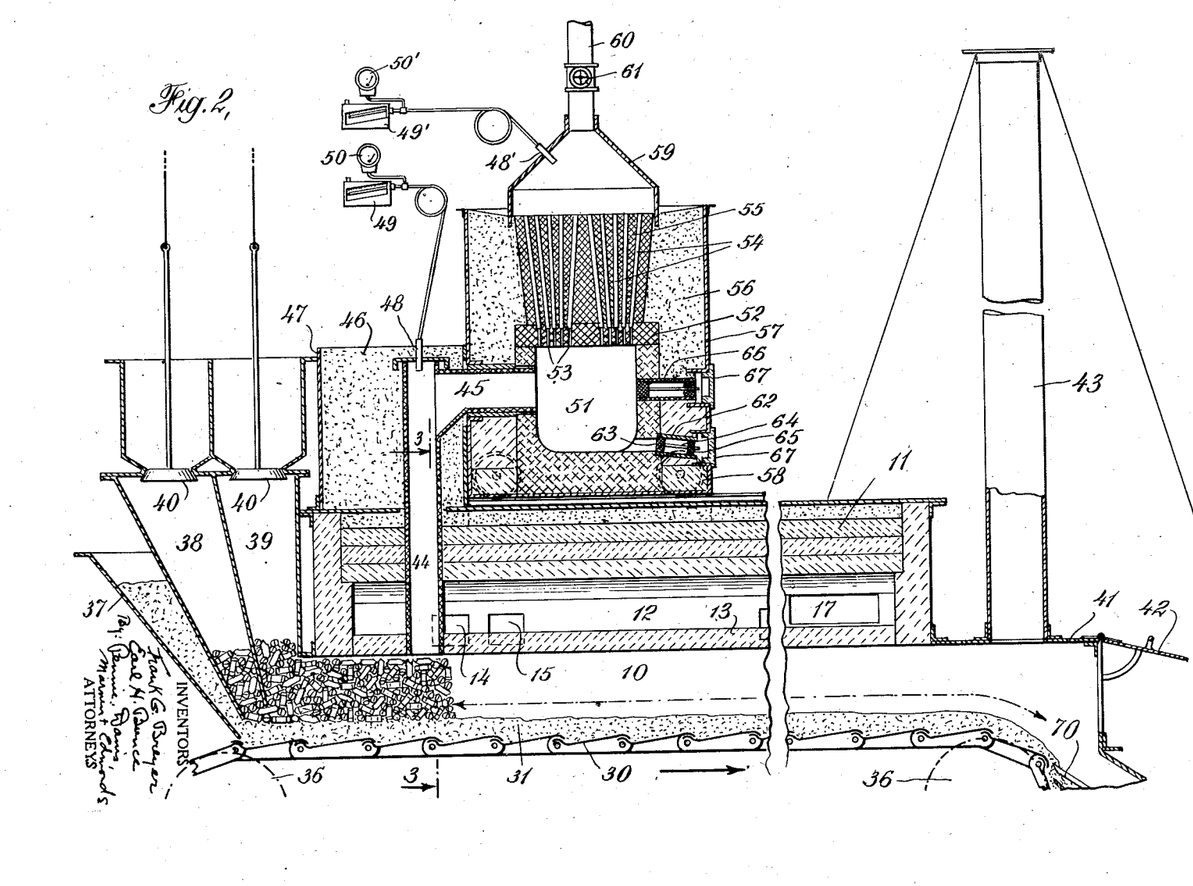
Fig. 2 is a longitudinal sectional elevation on the section line 2—2 of Fig. 1.
Figure 3:
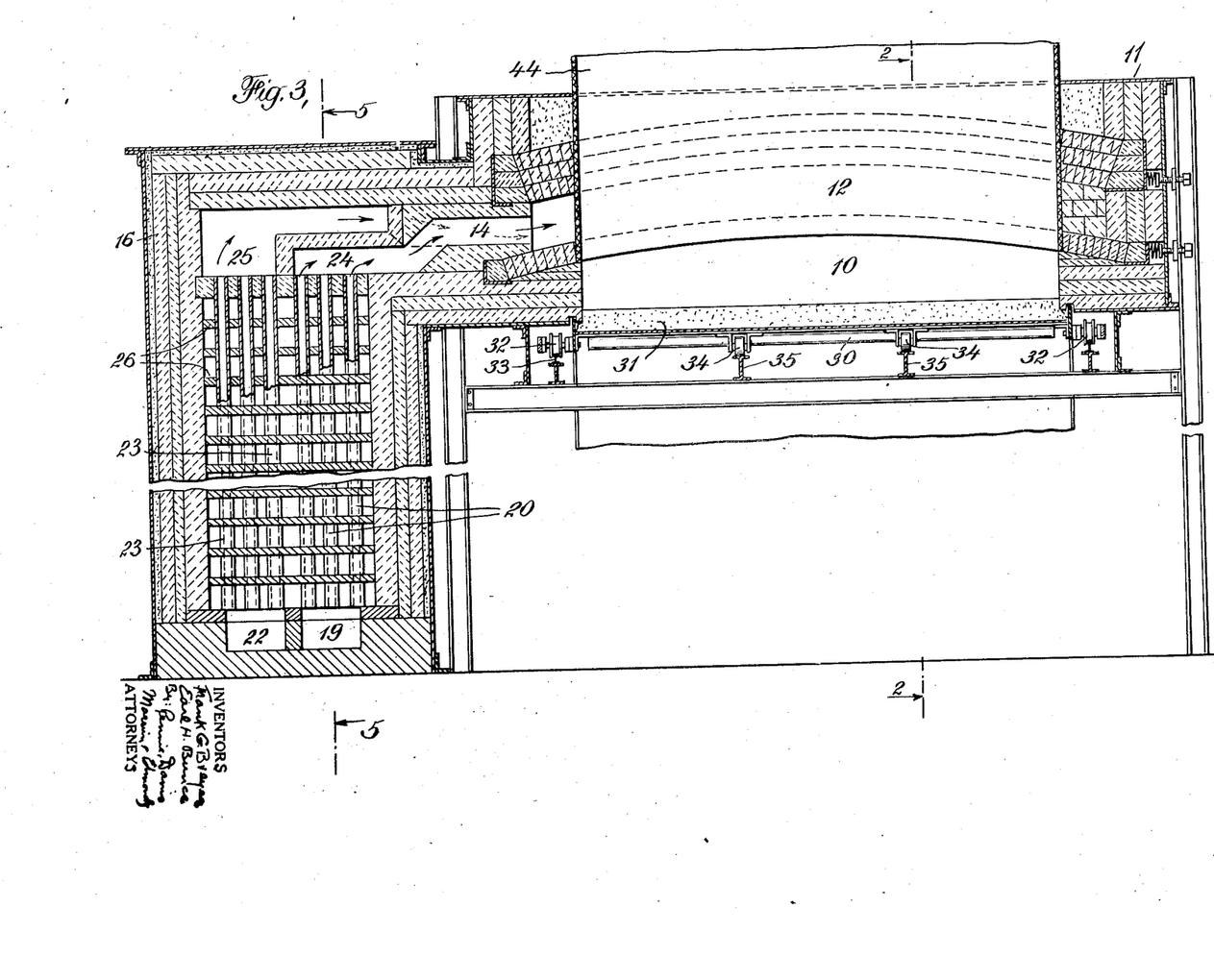
Fig. 3 is a transverse sectional elevation on the section line 3—3 of Fig. 1.
Figure 4:
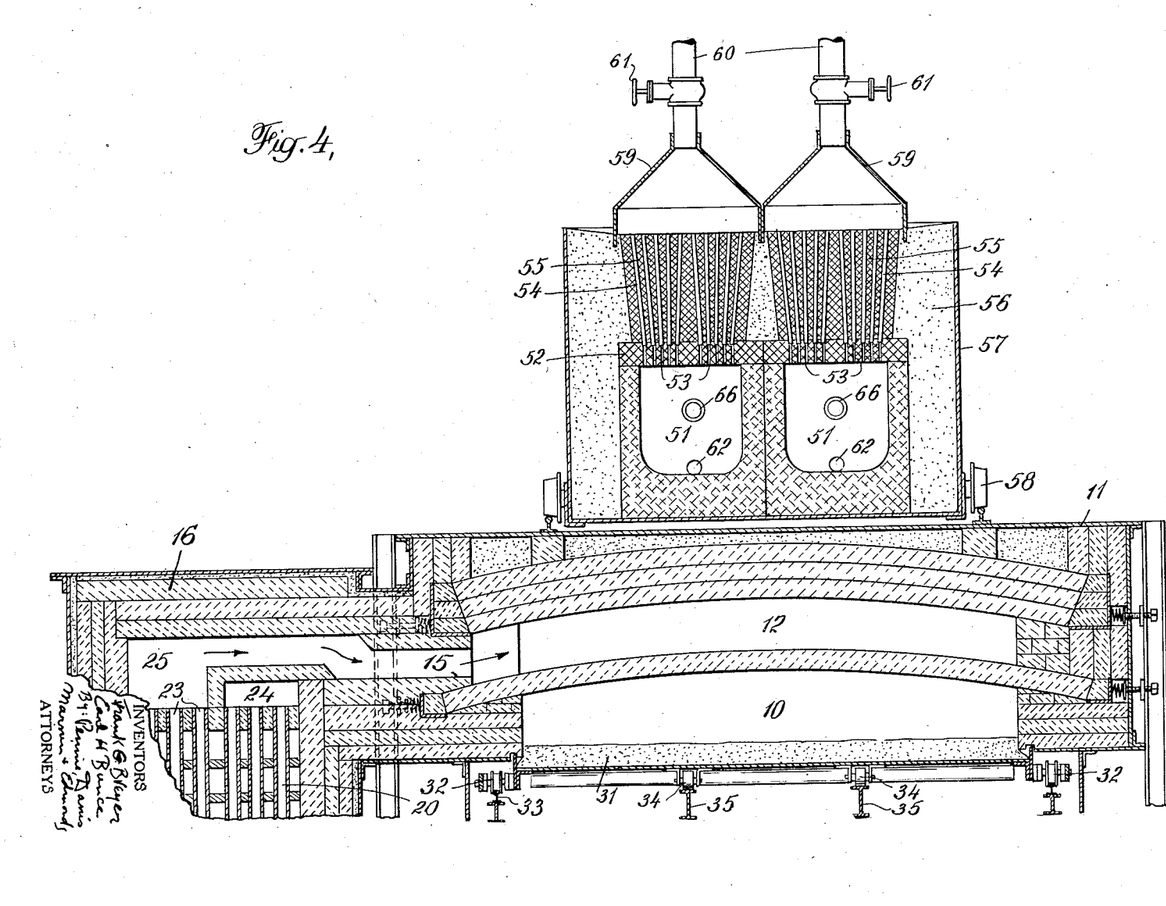
Fig. 4 is a transverse sectional elevation on the section line 4—4 of Fig. 1.

In practicing our present invention in the apparatus illustrated in the drawings, we preferably conduct the operations in accordance with the principles described in our aforementioned copending application. The pan conveyors as they enter the reducing chamber traveling in the direction indicated by the arrow (Fig. 2) are covered with an appropriate layer of fine material delivered onto the pans from the hopper 37. Worked-off or spent agglomerates are delivered onto the bed of fines from the hopper 38 and become partially embedded in the fines and to this extent prevent the embedding of the agglomerates undergoing reduction. The bed of fines should be of a depth adapted to cushion the agglomerates against objectionable jarring as the pan conveyor 30 travels through the reducing chamber 10. Unless the agglomerates are gently moved through the chamber, they will tend to be jostled against one another and thus settle into a compact mass that is not conducive to a free flow of gases through the voids normally present in an agglomerated charge. The agglomeration of the mixed charge, including the size, shape, strength and manner of making the agglomerates as well as the progression of the agglomerates through the reducing chamber, are conducted with the view of securing the optimum conditions for the rapid transfer of heat through the agglomerated charge by currents of hot gases. The agglomerated charge is delivered from the hopper 39 onto the layer (approximately one agglomerate deep) of spent agglomerates. The layer of spent agglomerates interposed between the bed of fines and the overlying layer of agglomerates undergoing reduction insures the desired porosity of the entire bed of these latter agglomerates, and, consequently, the efficient transfer of heat by currents of hot gases throughout the bed of these agglomerates. The layer of agglomerates comprising the charge proper is of a depth adapted to avoid crumbling of the lowermost agglomerates by the overhead agglomerates. The spent residues and fines are discharged from the pan conveyor onto a grizzly 70 through which the fines pass while the agglomerates slide down the grizzly and are appropriately disposed of. The fine material passing through the grizzly is conveyed back to the fines hopper 37 in such amount as required, and an appropriate amount of the spent or worked-off agglomerates is conveyed back to the hopper 38.

The reducing chamber 10 of the furnace illustrated in the drawings is approximately 12 feet wide and 60 feet long. The heating of the reducing chamber is controlled by maintaining a temperature of about 1300 to 1400° C. in the heating flue 12 approximate the charging end of the furnace and a temperature of about 1200° C. in this flue approximate the discharging end of the furnace. The bed of fines is approximately 6 to 9 inches deep and the agglomerated charge near the center of the arch is approximately 15 to 18 inches deep. Approximately 30 tons of agglomerates will be charged to the furnace per 24 hours. The spent agglomerates or worked-off residues are preferably discharged from the reducing chamber with an average zinc content not exceeding about six per cent, and under favorable conditions of operation this figure may be substantially reduced.

The agglomerated charge substantially fills the reducing chamber above the bed of fines and interposed layer of spent agglomerates and is progressively advanced through the chamber by the movement of the pan conveyor. The mixture of metallic zinc vapor and carbon monoxide gas (resulting from the reduction of the zinciferous material in the agglomerated charge) passes from the reducing chamber through the gas outlets 44 and 68 into the four multi-channeled condensers on top of the furnace structure. Substantially all of the zinc vapor may be condensed to molten zinc metal in these condensers. In actual practice we aim to condense at least 90% of the zinc vapor as zinc metal, the remainder of the zinc vapor being condensed as blue powder or burned to zinc oxide, both of which products may be recovered by appropriate means. From time to time, molten zinc metal is withdrawn from the condensers through their tap holes.

In the working off of the agglomerated charge, the zinc compounds in the ore (or other zinciferous material) are reduced to metallic zinc when the carbon in the carbonaceous reducing agent combines with the oxygen of the zinc compounds. The resulting metallic zinc vapor and carbon monoxide gas constitute the gaseous products of the reduction, and it is the flow of these gases from their points of generation in the charge through the agglomerates towards the gas outlet of the reducing chamber that provides the medium for the effective transfer of heat from the hot chamber wall throughout the charge by currents of highly heated gases moving at relatively high velocity.

It is desirable that the gaseous products of the reduction issuing from the reducing chamber be relatively pure carbon monoxide gas and zinc vapor, and for this reason it is desirable to maintain within the reducing chamber a strictly reducing atmosphere. It is characteristic of our invention that the gaseous product issuing from the reducing chamber contains metallic zinc vapor capable of being directly and economically condensed to zinc metal. By directly condensible to zinc metal we mean that if the gaseous product is conducted directly (and without intermediate treatment) from the reducing chamber into one or more condensers of the present spelter retort furnace type, at least 60% of the metallic zinc vapor in the gaseous product will be condensed as zinc metal. By economically condensible to zinc metal we mean the condensation to zinc metal of at least 60% of the metallic zinc vapor in the gaseous product with a reasonable number of condensers of the present spelter retort type per ton of metal condensed in a given time. It is to be understood, of course, that this language is used merely to describe the qualities of the gaseous product, and is not intended to necessarily mean that the metallic zinc vapor is, in practicing the invention, actually condensed to zinc metal. For, as previously stated, the metallic zinc vapor contained in the gaseous product issuing from the reducing chamber may, if desired, be condensed as zinc dust or blue powder, or burned or oxidized to pigment zinc oxide, where it is desired to manufacture these zinc products rather than zinc metal or spelter.

Figures 6, 7:
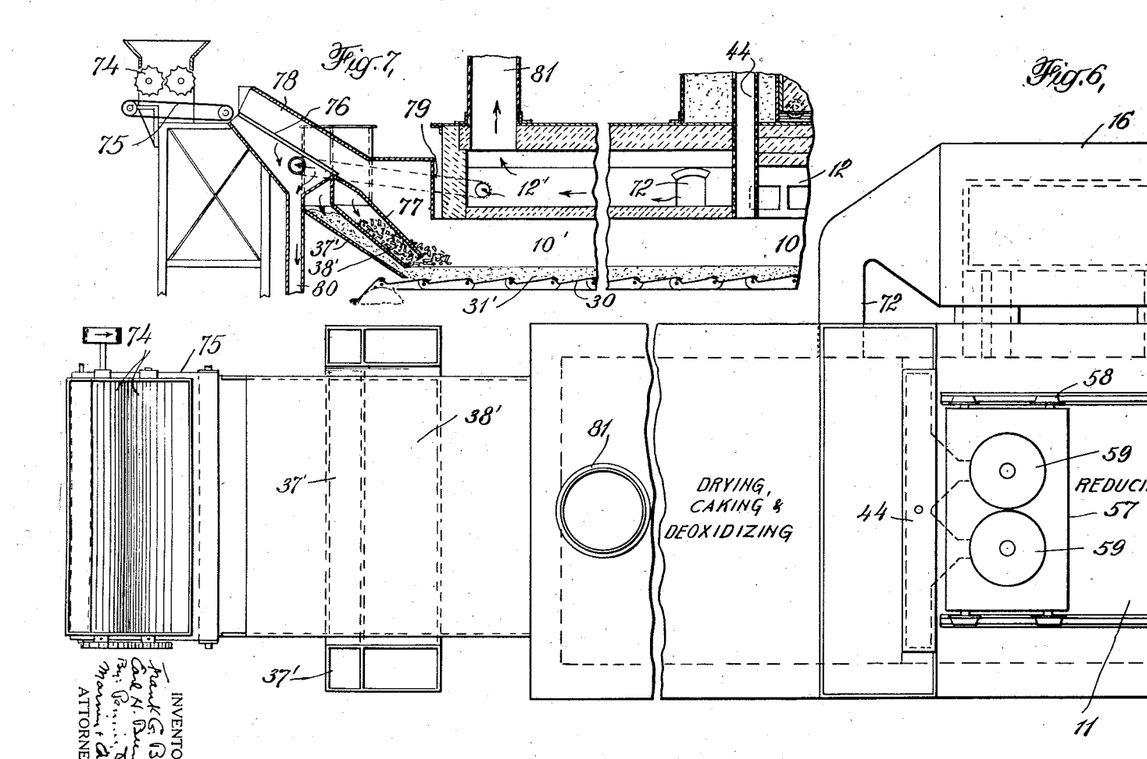
Fig. 6 is a diagrammatic top plan view of a slightly modified form of apparatus.
Fig. 7 is a detail sectional elevation of the charging end of the apparatus of Fig. 6.

In Figs. 6 and 7 of the drawings, we have illustrated an arrangement of apparatus for conducting the drying, caking, deoxidizing or other preliminary heat treatment of the agglomerates while supported on the same traveling hearth that conveys the agglomerates through the reducing chamber. The furnace structure is extended, at the charging end, to provide, in effect, prolongations 10' and 12' of the reducing chamber 10 and heating flue 12, respectively. The pan conveyor 30' is similarly lengthened to extend through the chambers 10 and 10'. The exhaust gases from the recuperator 16 are conducted by a pipe 72 to the heating flue 12'. The gas-outlet 44, extending across the entire width of the heating flue, constitutes a partition or bulkhead between the flues 12 and 12'.

A briquetting press 74 is mounted adjacent the charging end of the furnace at a sufficient elevation to enable the briquets to pass into the chamber 10' largely by the action of gravity. Thus, the briquets drop from the forming rolls onto a conveyor 75 that conducts them to an inclined grizzly 76. The briquets slide down the grizzly 76 over a chute 77 onto the layer of spent agglomerates (charged from the hopper 38') overlying the bed of fines 31' (charged from the hopper 37'). The grizzly 76 and chute 77 are preferably enclosed by a sheet metal casing 78. A controlled amount of gas may be withdrawn from the flue 12' through a pipe 79 and introduced beneath the grizzly 76 for preliminarily drying or heating the briquets as they slide down the grizzly. The material passing through the grizzly 76 falls through a conduit 80 and is appropriately disposed of. A stack 81 communicates with the flue 12' for conveying away the exhaust heating gases.

The operation of the apparatus illustrated in Figs. 6 and 7 will be understood from the foregoing description. The porous charge of agglomerates is conveyed through the preliminary heat treatment chamber and the reducing chamber while supported on a traveling hearth and under conditions avoiding substantially relative movement of individual agglomerates. In the chamber 10' the agglomerates are subjected to the desired drying, caking, deoxidizing or other treatment operation, and are then advanced directly into the reducing chamber 10.

The reducing chamber is relatively long in the direction of charge progression and of a substantial width. The dimensions we have hereinbefore mentioned, 60 feet long and 12 feet wide, are illustrative, but are not to be considered as limiting the application of the invention. In some cases it will be found advantageous to construct the reducing chamber with a slight inclination from the charging end towards the discharging end. Such an inclination assists, by the action of gravity, the movement of the pan conveyor and its supported charge through the chamber, and where the capacity of the reducing chamber is relatively large a substantial economy in power consumption is thereby effected.

We claim:

1. The method of reducing zinciferous materials, which comprises progressively passing a porous charge of agglomerates of mixed zinciferous and reducing materials through a substantially horizontal and externally heated reducing chamber, said charge of agglomerates being supported on a bed of fines carried by a traveling conveyor with a layer of coarse material disposed intermediate the bed of fines and the charge of agglomerates, heating the agglomerates in the course of their passage through said chamber to a sufficiently high temperature to reduce the compounds of zinc and volatilize the resulting metallic zinc, and withdrawing a gaseous product containing metallic zinc vapor from the reducing chamber.

2. The method of reducing zinciferous materials, which comprises progressively passing a porous charge of zinciferous and reducing materials through a substantially horizontal and externally heated reducing chamber, said charge being supported in its passage through said chamber upon a bed of fines carried by a traveling conveyor with a layer of coarse material disposed intermediate the fines and the charge, heating said charge in the course of its passage through said chamber to a sufficiently high temperature to reduce the compounds of zinc and volatilize the resulting metallic zinc, the transfer of heat from the heated wall of the reducing chamber through the charge being effected in large part by currents of hot gases generated within the charge and flowing through the voids thereof, towards the gas outlet of the reducing chamber, and withdrawing from the reducing chamber a gaseous product containing metallic zinc vapor.

3. An apparatus for reducing zinciferous material comprising a relatively long and substantially horizontal reducing chamber, a heating flue overlaying the top of said chamber, a movable hearth adapted to convey a charge of agglomerates under conditions substantially avoiding relative movement of individual agglomerates through said chamber, a gas off-take communicating with said chamber and extending upwardly through said flue, and a condenser operatively associated with said gas off-take.

4. An apparatus for reducing zinciferous material comprising a relatively long and substantially horizontal reducing chamber, a pan conveyor adapted to move a charge of agglomerates under conditions substantially avoiding relative movement of individual agglomerates through said chamber and forming in effect the bottom thereof, a heating flue overlaying the top of said chamber, and a gas off-take communicating with said chamber and extending upwardly through said flue.

5. An apparatus for reducing zinciferous material comprising a relatively long and substantially horizontal reducing chamber, a pan conveyor adapted to move a charge of agglomerates under conditions substantially avoiding relative movement of individual agglomerates through said chamber and forming in effect the bottom thereof, means for covering said conveyor with a bed of fines, means for introducing the charge to be reduced upon said bed of fines, a heating flue overlaying the top of said chamber, and a gas off-take communicating with said chamber and extending upwardly through said flue.

6. An apparatus for reducing zinciferous material comprising a substantially horizontal preliminary heat-treatment chamber and a substantially horizontal reducing chamber, a movable hearth adapted to convey a charge through said heat-treatment chamber and through said reducing chamber, means for externally heating said reducing chamber, and means for withdrawing from said reducing chamber the gaseous products generated therein.

7. An apparatus for reducing zinciferous material comprising a substantially horizontal preliminary heat-treatment chamber and a substantially horizontal reducing chamber, a pan conveyor adapted to move through said chambers and forming in effect the bottoms thereof, means for covering said conveyor with a bed of fines, means for introducing the charge to be treated upon said bed of fines, means for externally heating said reducing chamber, and means for withdrawing from said reducing chamber the gaseous products generated therein.

8. An apparatus for reducing zinciferous material comprising a substantially horizontal preliminary heat-treatment chamber and a substantially horizontal reducing chamber, a movable hearth adapted to convey a charge through said heat-treatment chamber and through said reducing chamber, means for externally heating said reducing chamber, a recuperator operatively associated with the heating means for said reducing chamber, means for utilizing the exhaust gases from the recuperator for heating said heat-treatment chamber, and means for withdrawing from said reducing chamber the gaseous products generated therein.

9. The method of reducing zinciferous materials which comprises passing a porous charge of agglomerates of mixed zinciferous and reducing materials through a substantially horizontal and externally heated reducing chamber without substantial breaking down of the agglomerates during their entire passage through the chamber and under conditions substantially avoiding relative movement of individual agglomerates, said charge of agglomerates being spread out in the form of a layer having a depth adapted to avoid crumbling of the lowermost agglomerates by the overhead agglomerates, the agglomerates being conducted through the chamber with a gentle movement adapted to avoid objectionable jarring and abrading of the agglomerates, heating the agglomerates in the course of such passage to a sufficiently high temperature to reduce the compounds of zinc and volatilize the resulting metallic zinc, the transfer of heat from the heated wall of the reducing chamber through the charge being effected in large part by currents of hot gases generated within the charge and flowing through the voids thereof towards the gas outlet of the reducing chamber, and withdrawing a gaseous product containing metallic zinc vapor from the reducing chamber.

10. The method of reducing zinciferous materials which comprises passing a porous charge of agglomerates of mixed zinciferous and reducing materials supported upon a traveling hearth through a substantially horizontal and externally heated reducing chamber without substantial breaking down of the agglomerates during their entire passage through the chamber and under conditions substantially avoiding relative movement of individual agglomerates, said charge of agglomerates being spread out in the form of a layer having a depth adapted to avoid crumbling of the lowermost agglomerates by the overhead agglomerates, the agglomerates being conducted through the chamber with a gentle movement adapted to avoid objectionable jarring and abrading of the agglomerates, heating the agglomerates in the course of such passage to a sufficiently high temperature to reduce the compounds of zinc and volatilize the resulting metallic zinc, the transfer of heat from the heated wall of the reducing chamber through the charge being effected in large part by currents of hot gases generated within the charge and flowing through the voids thereof towards the gas outlet of the reducing chamber, and withdrawing a gaseous product containing metallic zinc vapor from the reducing chamber.

11. The method of reducing zinciferous materials which comprises passing a porous charge of agglomerates of mixed zinciferous and reducing materials supported upon a bed of fines carried by a travelling conveyor through a substantially horizontal and externally heated reducing chamber without substantial breaking down of the agglomerates during their entire passage through the chamber and under conditions substantially avoiding relative movement of individual agglomerates, the bed of fines being adapted to cushion the agglomerates against the jarring movement of the traveling conveyor, said charge of agglomerates being spread out in the form of a layer having a depth adapted to avoid crumbling of the lowermost agglomerates by the overhead agglomerates, the agglomerates being conducted through the chamber with a gentle movement adapted to avoid objectionable jarring and abrading of the agglomerates, heating the agglomerates in the course of such passage to a sufficiently high temperature to reduce the compounds of zinc and volatilize the resulting metallic zinc, the transfer of heat from the heated wall of the reducing chamber through the charge being effected in large part by currents of hot gases generated within the charge and flowing through the voids thereof towards the gas outlet of the reducing chamber, and withdrawing a gaseous product containing metallic zinc vapor from the reducing chamber.

12. The method of reducing zinciferous material which comprises progressively passing a porous charge of agglomerates of mixed zinciferous and reducing materials through a substantially horizontal preliminary heating chamber and a substantially horizontal and externally heated reducing chamber, without substantial breaking down of the agglomerates during their entire passage through said chambers, said charge of agglomerates being successively passed first through said heating chamber and then through said reducing chamber under conditions substantially avoiding relative movement of individual agglomerates during their passage through said chambers, said charge of agglomerates being spread out in the form of a layer having a depth adapted to avoid crumbling of the lowermost agglomerates by the overhead agglomerates, the agglomerates being conducted through said chambers with a gentle movement adapted to avoid jarring and abrading of the agglomerates, subjecting the agglomerates in the course of their passage through the heating chamber to a preliminary heating operation, heating the agglomerates in the course of their passage through the reducing chamber to a sufficiently high temperature to reduce the compounds of zinc and volatilize the resulting metallic zinc, the transfer of heat from the heated walls of the reducing chamber through the charge being effected in large part by currents of hot gases generated within the charge and flowing through the voids thereof towards the gas outlet of the reducing chamber, and withdrawing the gaseous product containing metallic zinc vapor from the reducing chamber.

In testimony whereof we affix our signatures.

FRANK G. BREYER.
EARL H. BUNCE.